Aug. 27, 1957      J. R. ROGERS      2,804,612
AUTOMATIC RANGE TRACKING CIRCUIT
Filed Feb. 1, 1946
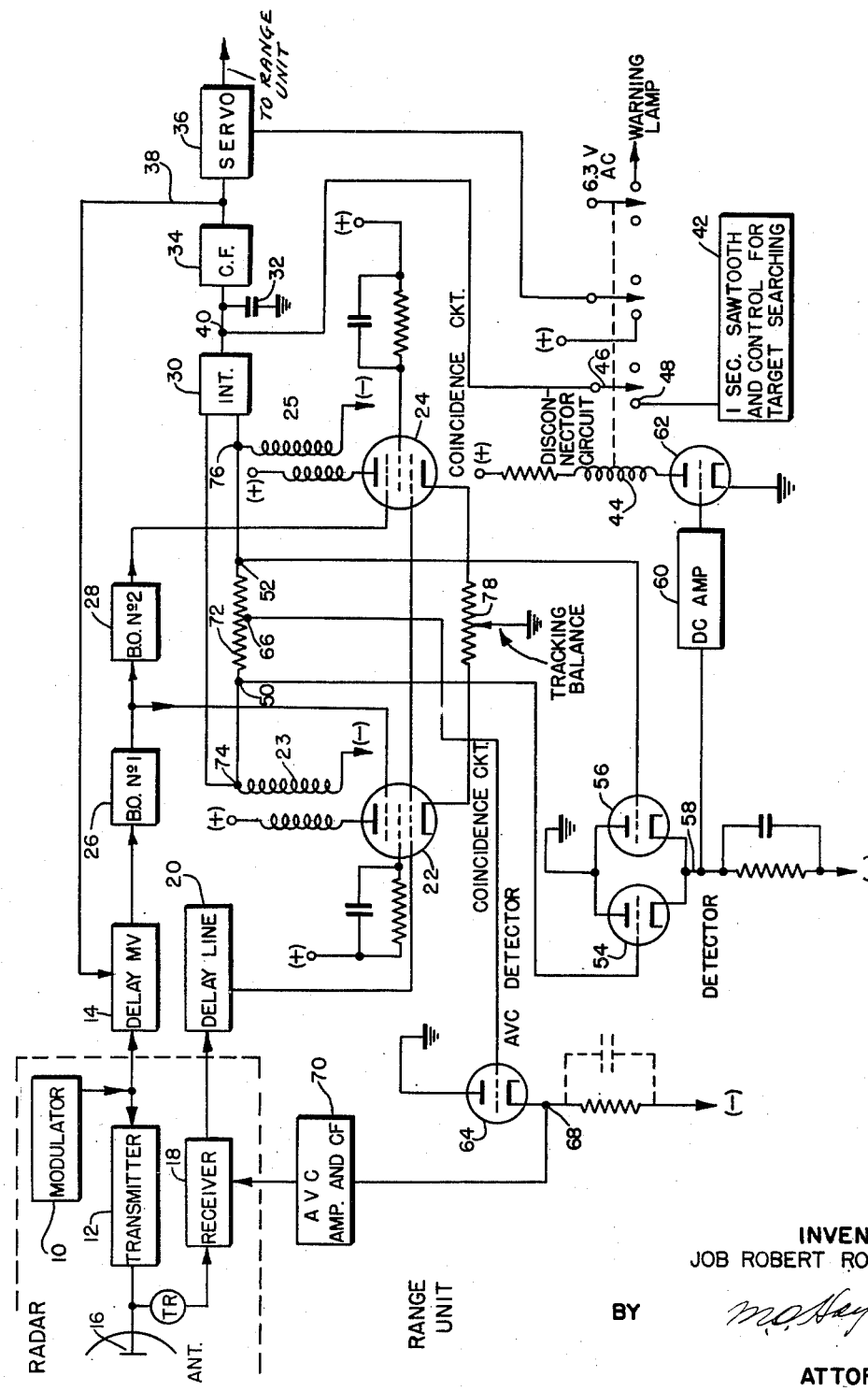
INVENTOR
JOB ROBERT ROGERS
BY
ATTORNEY United States Patent Office 2,804,612
Patented Aug. 27, 1957

2,804,612

AUTOMATIC RANGE TRACKING CIRCUIT

Job Robert Rogers, Cambridge, Mass., assignor, by mesne assignments, to the United States of America as represented by the Secretary of the Navy Application February 1, 1946, Serial No. 644,969

5 Claims. (Cl. 343—7.3)

This invention relates to radar range tracking systems and more particularly to range tracking circuits which enable automatic searching for targets and automatic tracking of a selected target.

There are numerous systems of automatic range tracking known to the art, and as an example thereof reference is made to copending application entitled, "Range Unit," Serial Number 604,270 filed July 10, 1945, by Edward F. MacNichol, Clarance M. Connelly and Job Robert Rogers.

The above application disclosed a system of radio echo detection and automatic range tracking of a selected target. It contained provisions for automatically searching from zero to maximum range of the echo detection system, and also a provision for disconnecting the automatic search when a target was detected and a manual control for selecting targets if desired. The system is subject to certain limitations in automatically tracking a selected target echo, namely, tracking could be performed better on one edge of a target pulse and approaching targets could be tracked faster. In addition the means of automatically shifting from the automatic search to the automatic tracking has been found not entirely satisfactory. The present application deals with improvements of the invention disclosed in the above application, and has as a primary object the provision of an improved electrical system of automatic searching and range tracking.

Another object is to provide an improved and more reliable system for automatically tracking a particular target echo.

A further object is to provide an improved system for automatically disconnecting the automatic search to enable automatic tracking of a particular target.

A still further object is to provide an improved automatic range tracking radar system having an automatic volume control provision in the receiver for controlling its gain so as to increase the rate of correction of the tracking circuit.

A still further object is to provide an improved automatic tracking radar system wherein an automatic search circuit is activated whenever the receiver fails to detect a target pulse at the setting of the automatic tracking circuit.

These and other objects will be apparent from the following specification when taken with the accompanying drawing which illustrates the features of the invention.

In order to present a clearer description of the invention it will first be described briefly with reference to the figure. This brief description will also serve to review the operation of the earlier form of the invention given in the above application.

The system is used to search for targets by radio echo detection and to track any such target automatically when it is detected. A radar system is used in searching for and detecting targets. A range unit is used for automatic range tracking and a sawtooth generator in the range unit provides automatic searching.

The radar operates in the usual manner and in addition supplies a trigger pulse and echo known as a video signal to the range unit. The trigger pulse is supplied by the modulator to a precision delay multivibrator (hereinafter abbreviated MV) or other delay device 14. This MV 14 initiates and displaces in time two short pulses or narrow gates, known as an early gate and a late gate, which are developed in the blocking oscillators (hereinafter abbreviated B. O.) 26 and 28. These pulses are displaced so that one starts as the other ends. These pulses are applied to the suppressor grids of the respective coincidence tubes 22 and 24. Video echo signals from the radar receiver are applied through a delay line 20 to the control grids of the coincidence tubes 22 and 24. The delay is provided to permit the early gate to precede the echo pulse even at zero range of the radar and to allow operation on the latter part of the delay sweep where linearity is better. If there is coincidence between either or both gate pulses and the video pulse, one or both tubes will conduct in proportion to the relative time of overlap of the echo with respect to the gates. If there is no coincidence between the echo pulse and the gate pulses the coincidence tubes will not conduct and if coincidence occurs only between the echo pulse and one gate pulse only the corresponding coincidence tube will conduct. The output from the coincidence tubes 22 and 24 is fed to the integrator circuit 30. If most of the echo pulse occurred during the early gate the integrator will reduce the voltage on capacitor 32 but if most of the echo pulse occurs during the later gate the voltage on capacitor 32 will increase. There will be a relative overlap of the echo pulse and the two gates for which the voltage on capacitor 32 will not change. This voltage is fed through the cathode follower 34 to the servo 36 which provides accurate range data, and also couples back to the MV 14 to correct the position of the narrow gates as necessary to continue tracking the echo pulse. The voltage on capacitor 32 will be proportional to target range. When no target is being tracked with the gates, there will not be an output from the coincidence tubes 22 and 24 and the detector tubes 54 and 56 will not be operating. This will allow the disconnector circuit composed of tube 62 and relay 44 to connect contact 46 to point 48.

Automatic range search is provided by sawtooth generator 42 the voltage output of which is coupled through contact 46 to the capacitor 32 at point 40. Thus, the variation of the potential on capacitor 32, will sweep the MV through the range of the radar until a target is found. When a target is located there will be an output from one or both of coincidence tubes 22 and 24. This will be detected by either or both detector tubes 54 and 56 which will operate the disconnector circuit to cause relay 44 to open the contact 46 and allow the automatic range tracking, described above, to operate.

An automatic volume control (hereinafter abbreviated AVC) composed of detector tube 64 and amplifier 70 is provided to control the gain of receiver 18.

The operation of the improved range unit will now be discussed in detail with reference to the same figure.

In the radar, the modulator 10 supplies a periodic trigger to a transmitter 12 and a delay MV 14. This causes the transmitter 12 "to fire" and send out a high energy, high frequency pulse from antenna 16 which is returned from a target and detected by the receiver 18 after a time lapse equivalent to target range. The echo from receiver 18 is applied to the delay line 20 and thence to the control grids of the coincidence tubes 22 and 24. The delay MV 14 after receiving a trigger from modulator 10 introduces a variable delay and puts out a trigger to B. O. 26 which in turn puts out a positive square pulse (hereinafter called a gate) with a trailing edge occurring at the time of the echo pulse as it comes from delay line 20. It also triggers B. O. 28 so that it puts out a square gate like the gate from B. O. 26 which starts at approximately the time the first gate ends. Thus the two square gates bracket the echo pulse. These gates are applied to the suppressor grids of the respective coincidence tube 22 and 24.

If the echo pulse occurs between the two gates the extent of conduction and hence the outputs from tubes 22 and 24 will be equal. If the echo pulse does not occur between the two gates but on either side then one or the other coincidence tube will conduct more. If the echo pulse and gate do not occur together in either coincidence tube there will not be any output from the tube. The coincidence outputs are applied to the integrator circuit 30. Integrator 30 will be unaffected when the applied pulses are equal. However, if the echo pulse occurs early, tube 22 will conduct more than 24 and the inputs to the integrator 30 will be unequal. This then changes the voltage on capacitor 32 accordingly, and this change is applied to cathode follower 34 and in turn to the servo unit 36. It will also be applied over lead 38 to the delay MV 14 to vary the delay introduced by MV 14 to reposition the gates so they will straddle the echo pulse from the radar. The voltage from cathode follower 34 is proportional to the range of the target so that the servo may be used to drive a range indicator or other device.

Thus it is seen that when a target echo is detected it will be tracked automatically by the range unit. To provide means for automatically searching for a target, the sawtooth generator and control circuit 42 are incorporated into the system. When no target is being tracked relay 44 will have its contact arm 46 making contact at terminal 48, the latter being connected to the sawtooth circuit 42. Circuit 42 will provide a sweep voltage which will be applied at 40 to the capacitor 32. The voltage here as already explained will be fed back to MV 14. This sweep voltage will vary the delay of the MV 14, which will cause the gates to sweep over the range of the detection system.

When a target is found which occurs at the time of the gates one or both of the coincidence tubes 22 or 24 will conduct more depending on the position of the target echo with respect to the gates. The outputs from the two coincidence circuits 22 and 24 which are coupled through transformers 23 and 25 are picked up at points 50 and 52 and applied to the respective control grids of detector tubes 54 and 56. Any output from coincidence tube 22 is detected by the detector tube 54 and any output from coincidence tube 24 is detected by the detector tube 56. The outputs from the detector tubes 54 and 56 will appear at point 58 which is common to both cathodes. This resulting output which does not vary appreciably for wide changes of relative overlap between the echo pulse and the gates, is applied through amplifier 60 to the grid of tube 62 in the disconnector circuit. When tube 62 operates relay 44 breaks the contact 46 from point 48 to remove the search circuit 42 from the system. Thus, the automatic search system is automatically disconnected when a target is detected to permit automatic range tracking of the target within wider limits because of the overlap between the echo pulse and both gates.

The tracking balance control potentiometer 78 in the coincidence circuits allows the relative bias on the two coincidence tubes 22 and 24 to be varied to control the conduction ratio of one coincidence tube with respect to the other. In this way slight differences in the tubes can be adjusted for. In addition this adjustment can be varied effectively to change the position which the double gates assume with respect to the echo pulse envelope. This allows favoring of approaching or receding targets by varying the tracking balance control 78.

To provide for further control of the range unit an automatic volume control circuit is used. This is ener-gized from tap 66 the midpoint of resistor 72 which is connected between the output points 74 and 76 of the coincidence transformer secondary circuits. The voltage from tap 66 is applied to the grid of the AVC tube 64. The output is taken at point 68 on the cathode and fed through an appropriate amplifier and coupling cathode follower 70 to the radar receiver 18. When the echo from the receiver occurs at the midpoint of the gates from the blocking oscillators 26 and 28, the outputs from both coincidence circuits at 74 and 76 will contribute to the voltage at point 66 from which the AVC detector 64 is energized. If the echo gets off to either side of the center of the gates one coincidence tube will put out a larger signal than the other. This will cause a rise in voltage at terminal 66 and the grid of tube 64 which will increase the output of the AVC detector 64. The AVC detector 64 has a narrower characteristic than the detector tubes 54 and 56 and causes the AVC to drop off first and give maximum gain before the detector circuit allows the automatic search circuit to resume operation. This increased AVC voltage will increase the gain of receiver 18. On the next radar pulse the receiver 18 will put out a larger echo signal which will mean that coincidence circuits will then put out a larger corrective voltage to correct the tracking error more rapidly. With the present arrangement the AVC is particularly sensitive to the phase relation of the target signal and tracking gates and is unsymmetrical in this respect. That is, it can be made to track readily on either approaching or receding targets. In the detector disclosed hereinabove the gates may be phased in range relative to the signal with slight change in the detector output over a wide range. The detector output is chiefly dependent on the coincidence tube grid with the greatest positive swing. Thus since the outputs of both coincidence tubes 22 and 24 are detected, the tracking balance control 78 may be adjusted so that the gates track on the leading or on the trailing edge of the video pulse. If the gates track on the trailing edge of the video the early gate will assume the burden and will chiefly control the output of the detector. If the gates track on the leading edge of the video the late gate will chiefly control the output of the detector. Thus it may be seen that the output of the detector is not too critically related to the relative position or overlap of the gate with respect to the video pulse and the gates can be phased relative to the signal without altering the threshold value at which the disconnector circuit operates. Similarly, when the speed of tracking varies, it is obvious that the position of the gates relative to the video will vary, and with the new arrangement, this relative position does not control the threshold of the disconnector circuit.

The improved system thus provides more reliable automatic tracking of approaching or receding targets as predetermined, and more accurate control of the automatic switching between automatic search and automatic tracking.

It is believed that the construction and operation as well as the advantages of the improved range unit will be apparent from the foregoing detailed description thereof. It will also be apparent that while I have shown and described my invention in a preferred form changes may be made in the circuit disclosed without departing from the spirit of the invention as sought to be defined in the following claims.

What is claimed is:

1. In combination with a radio pulse object locating system having a transmitter for periodically radiating radio frequency search pulses and a receiver for subsequently detecting these pulses after reflection from remote targets an automatic range tracking circuit, said circuit including means for comparing the time of occurrence of a selected target pulse detected by said receiver with first and second consecutive gate pulses generated a controllable time after the radiation of said search pulses and for producing first and second signals having amplitudes proportional to the amount of coincidence between said target pulse and each of said gate pulses, an automatic gain control circuit included in said receiver, means responsive to the production of unequal amplitude first and second signals for controlling said automatic gain control circuit to thereby increase the gain of said receiver whereby the following selected target pulse compared with said consecutive gate pulses has increased amplitude and whereby as a consequence the amplitude inequality of said first and second signals is magnified, means for deriving an error signal proportional to the difference in amplitudes of said first and second signals and means controlled by said error signal for changing the time of occurrence of said consecutive gate pulses with respect to the time at which said search pulses are radiated to equalize the amplitudes of said first and second signals and thereby minimize said error signal, said last mentioned means providing an indication of the range of the target corresponding to said selected target pulse.

2. In a system as defined in claim 1 wherein said means for increasing the gain of said receiver in response to the production of unequal amplitude first and second signals comprises an electron tube having its plate connected to a reference potential and its cathode coupled to a negative source of potential through a cathode resistor, means coupled to the grid of said tube for increasing its conductivity whenever unequal amplitude first and second signals are produced, means for connecting the cathode of said tube to the input of the automatic gain control circuit of said receiver, said electron tube performing as a relatively short time constant detector by virtue of the distributed capacitance of said cathode resistor.

3. In a system as defined in claim 2, means responsive to the nonproduction of both said first and second signals for substituting for said error signal a sawtooth voltage wave whereby the time of occurrence of said consecutive gate pulses is cyclically varied, said last mentioned voltage source being rendered ineffective whenever said selected target pulse coincides with a portion of either said first or second gate pulses.

4. In a system as defined in claim 2 wherein said means for cyclically varying the time of occurrence of said consecutive gate pulses comprises a double detector including first and second electron tubes, means for connecting the plates of said tubes to a reference potential and the cathodes of said tubes through a parallel resistance-capacitance network to a negative source of potential, means for applying blocking biases to the control grids of said tubes and means for selectively reducing said blocking biases in response to the production of either a first or second signal whereby an output voltage is produced across said network, a sawtooth voltage source adapted to be substituted for said error signal for changing the time of occurrence of said consecutive gate pulses, said last-mentioned voltage source being maintained ineffective by the output voltage from said electron tubes.

5. In combination with a radio pulse object locating system having a transmitter for periodically radiating radio frequency search pulses and a receiver for subsequently detecting these pulses after reflection from remote targets, an automatic range tracking and searching circuit comprising means for comparing the time of occurrence of a selected target pulse detected by said receiver with first and second consecutive rectangular gate pulses generated a controllable time after the radiation of each search pulse and for producing first and second signals having amplitudes proportional to the amount of time coincidence between said target pulse and said first and second consecutive gate pulses, respectively, an automatic gain control circuit associated with said receiver, means for deriving from said first and second signals a control signal whose amplitude is proportional to the average value of said first and second signals, a first detector, said detector comprising a cathode follower amplifying stage, means for coupling said control signal to the control grid of said cathode follower amplifier stage, means for feeding the voltage developed across the cathode resistor of said amplifying stage to the automatic gain control circuit to increase its gain in response to decreases in the average value of said first and second signals whereby the following selected target pulse detected by said receiver has its amplitude increased, means for deriving from said first and second signals an error signal having an amplitude proportional to the difference in amplitudes of said first and second signals, said error signal controlling the time of occurrence of said consecutive rectangular gate pulse with respect to the time at which each search pulse is radiated so as to equalize the amplitudes of said first and second signals, a second detector, said second detector comprising first and second triodes having their plates and cathodes interconnected so as to be in parallel and sharing a common cathode resistor, means for coupling said first and second signals to the control grids of said first and second triodes, respectively, and means responsive to a predetermined decrease in the voltage developed across said common cathode resistor brought about by the absence from said control grids of both said first and second signals for cyclically varying the time of occurrence of said consecutive rectangular gate pulses until a first or second signal appears on the control grid of either said first or said second triode.

References Cited in the file of this patent
UNITED STATES PATENTS

| | | |
|---|---|---|
| 2,409,448 | Rost | Oct. 15, 1946 |
| 2,410,424 | Brown | Nov. 5, 1946 |
| 2,412,612 | Godet | Dec. 17, 1946 |
| 2,416,591 | Muntz | Feb. 25, 1947 |
| 2,433,681 | Blumlein | Dec. 30, 1947 |
| 2,517,540 | Busignies | Aug. 8, 1950 |
| 2,628,349 | Nightenhelser | Feb. 10, 1953 |